Figure 1:
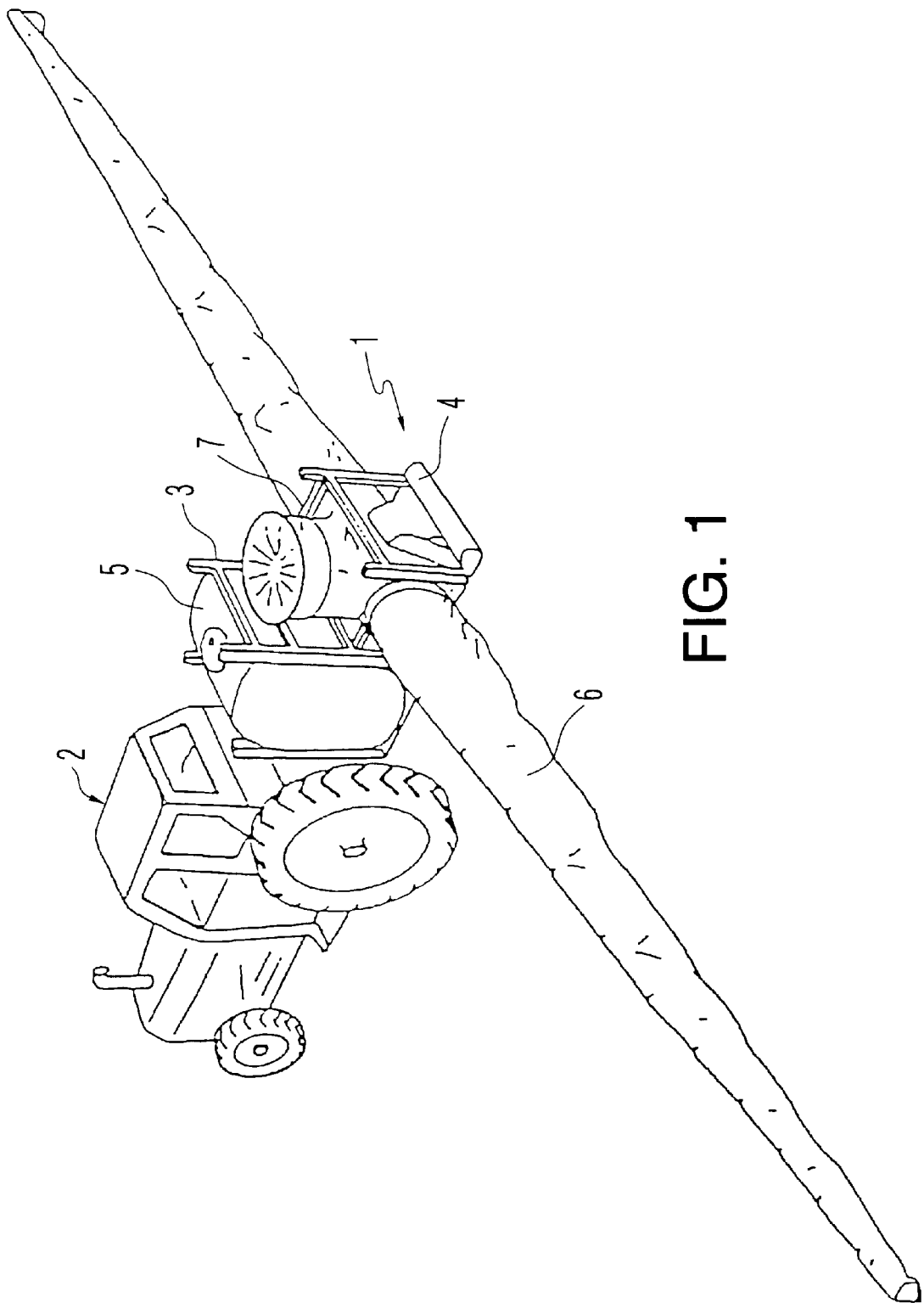

United States Patent [19]
Hedegaard

[11] Patent Number: 6,126,084
[45] Date of Patent: Oct. 3, 2000

[54] METHOD AND SPRAYER BOOM FOR SPRAYING A FIELD CROP WITH A PLANT PROTECTIVE LIQUID

[76] Inventor: Albert Hedegaard, Lille Hedegaardsvej 2, Borbjers, Holstebro 7500, Denmark

[21] Appl. No.: 09/230,779

[22] PCT Filed: Aug. 1, 1997

[86] PCT No.: PCT/DK97/00325

§ 371 Date: Jan. 29, 1999

§ 102(e) Date: Jan. 29, 1999

[87] PCT Pub. No.: WO98/06257

PCT Pub. Date: Feb. 19, 1998

[30] Foreign Application Priority Data

Aug. 2, 1996 [DK] Denmark ................................ 0826/96

[51] Int. Cl.⁷ ............................ B05B 17/00; B05D 17/00
[52] U.S. Cl. ................. 239/1; 239/399; 239/722
[58] Field of Search ................... 239/1, 8, 77, 146, 239/159, 172, 722, 726, 723, 399, 403, 405, 290, 291

[56] References Cited

U.S. PATENT DOCUMENTS

| | | |
|---|---|---|
| 3,339,846 | 9/1967 | Guetet .................................. 239/77 X |
| 4,927,080 | 5/1990 | Alsing ...................................... 239/77 |
| 4,982,898 | 1/1991 | Ballu ........................................ 239/77 |
| 5,176,322 | 1/1993 | Sator ........................................ 239/77 |

FOREIGN PATENT DOCUMENTS

| | | |
|---|---|---|
| 160916 | 3/1988 | Denmark . |
| 0326045 | 8/1989 | European Pat. Off. . |
| 0704157 | 4/1996 | European Pat. Off. . |
| 8907886 | 9/1989 | WIPO . |

*Primary Examiner*—Andres Kashnikow
*Assistant Examiner*—Sean P. O'Hanlon
*Attorney, Agent, or Firm*—Pennie & Emonds LLP

[57] ABSTRACT

A method serving the purpose of spraying a crop with a plant protective liquid. The liquid is sent out in the shape of a number of clouds (10) of atomized liquid in the direction of the crop (11) via a number of liquid nozzles (9) placed on a sprayer boom (8) which, at the same time, is driven across the crop (11). The nozzles (9) are adjusted to put each atomized liquid cloud (10) into whirling movement. The whirls (10) created thereby are stiff and stable against drifting. The liquid whirls (10) can be supported by a curtain of air whirls (14). By means of the method and the sprayer boom according to the invention, a crop can be sprayed efficiently with a minimum use of crop spray.

13 Claims, 7 Drawing Sheets

METHOD AND SPRAYER BOOM FOR SPRAYING A FIELD CROP WITH A PLANT PROTECTIVE LIQUID

The invention concerns a method for spraying a field crop with a plant protective liquid in the shape of a number of clouds of atomized liquid which are sent out in the direction of the field crop through a number of liquid nozzles placed on a sprayer boom which, at the same time, is driven across the field crop.

Protecting e.g. crop in this way against attacks of for instance fungi and insects has been known for a long time. In order to obtain an effective protection, the atomized liquid cloud must be able to penetrate into the crop and cover all parts of the crop surface, and it has therefore been necessary to use abundant quantities of plant protective liquid. For this reason, this known method cannot meet the demands made today to dosage of plant protective liquids out of consideration of the environment.

The development within the spraying technology has furthermore resulted in the fact that high spraying pressure is employed in order to obtain an atomized liquid cloud of extremely fine liquid particles which can be deposited in a very thin coat on the crop surface. It is thereby possible to reduce the quantity of crop spray, but the atomized liquid cloud will, at the same time, be very sensitive to drifting. In windy weather, the liquid cloud can therefore be likely to drift whereby the spraying will be uneven and damage can be done to the neighbouring fields.

From the Danish lay open publication No. 156806 B is known a field sprayer with a sprayer boom which, besides liquid nozzles, has air nozzles for sending an air current down towards the crop in the shape of an air curtain for preventing the atomized liquid cloud from drifting in windy weather. The air current opens furthermore the crop for the liquid cloud which therefore easily can penetrate into and be deposited on all parts of the crop surface. With this field sprayer, it has been possible to obtain an effective spraying with a heavily reduced quantity of crop spray. The liquid stream and the air current have a more or less laminar character and will therefore easily be driven out of position by great wind forces, unless the liquid stream and air current have a relatively higher velocity in relation to the wind velocity, whereby the quantities of crop spray and air used are increased correspondingly.

In order to eliminate the above said disadvantages of the known methods, it is the object of the invention to provide a method of the kind mentioned in the preamble, whereby a field crop can be sprayed at optimum with a minimum use of plant protective liquid.

The novel and unique features according to the invention, whereby this is achieved is the fact that each atomized liquid cloud is put into whirling movement. Thereby the atomized liquid cloud assumes the shape of a whirl which, as known, is extremely stiff and stable to external influences. The whirl is therefore not sensitive to drifting even in high wind. A second advantage is that the atomized whirl opens the crop and penetrates into all parts of this.

When the atomized clouds are transformed, in this way, into whirls, there is no need for an air curtain to protect the atomized liquid cloud from drifting to the same extend as in the field sprayer known from the said Danish lay open No. 156806 B. An air curtain can, however, support the stability of the atomized liquid clouds against drifting and especially so if it consists of a number of air currents which are also put into whirling movement.

By letting the atomized whirls and the air whirls whirl in the same direction, they will be inclined to merge into each other and become one single, strong whirl having a very high resistance to the effects of the wind. The atomized whirls and the air whirls are, in this way, literally woven into one coherent curtain of an unprecedented stability against drifting in high wind.

It is, however, an advantage when each of the two adjacent and thus melted together, strong whirls have opposite directions of rotation, since the whirls, at least to some extend, are overlapping each other. If the two adjacent whirls rotate in the same direction, they will, in the overlapping area, have opposite directions of flow which means the rotation of the whirls is slowed down. This negative effect will not be found, if the two whirls have opposite directions of rotation with the same direction of flow in the overlapping area. In this case, the whirls will, on the contrary, engage into each other in a gearing-like manner having the effect of each of the two whirls trying to bring the other whirl into its rotation.

The invention also concerns a sprayer boom for spraying a crop field with a plant protective liquid in the shape of a number of clouds of atomized liquid which, in the direction of the field crop, are sent out via a number of liquid nozzles placed on a sprayer boom which, at the same time, is driven across the field crop. This sprayer boom is, according to the invention, characteristic by the fact that the sprayer boom comprises means to put each atomized liquid cloud into whirling movement.

By an advantageous embodiment, the means to put each atomized cloud in whirling movement can consist of at least two nozzle orifices placed in each liquid nozzle and having axes which, seen from the side, cross each other at an angle of between 0° and 180° and at a mutual distance of between a half and one times the diameter of one of the atomized liquid clouds in the crossing area. Thereby each jet of atomized liquid from one nozzle orifice sets the other jet in rotation with the same direction of rotation, whereby the two rotating jets immediately after merge into one single atomized whirl.

The distance between the two nozzle orifices in a liquid nozzle can advantageously be between 1 and 20 times, preferably between 1 and 10 times and especially between 1 and 5 times the diameter of a nozzle orifice, whereby the sent out atomized liquid jets meet while they still are of a compact character and therefore behave more or less as a stiff body which can be made to rotate.

An especially simple and efficient structure is obtained when the liquid nozzle has the shape of a tube with an incurving bottom in which at least two nozzle orifices are made. Since the liquid is sent out inside the arch of the bottom, an air current which has been carried along will flow down on to the edge of the bottom and hold the atomized liquid cloud together and protect it. The cloud is, at this moment, already put into whirling movement.

By a second embodiment air having a high velocity and a rather small volume is used to set the atomized liquid into rotation. This takes place when there, in continuation of each liquid nozzle, is placed a shell connected to a compressed-air source and comprising means to bring the air into rapid rotation, whereby the atomized liquid is surrounded by a strong air whirl forcing the atomized liquid to follow it and disperse in the whirling air current. The air can, for example, be made to rotate by means of guide blades or by sending the compressed air tangentially into the tube.

A particularly advantageous and effective embodiment is obtained when a number of guide blades for putting the air current into whirling movement are placed along the periphery of each air nozzle, and a liquid nozzle for sending out a cloud of atomized liquid is placed in each air nozzle. The air, which normally has a far greater volume than the liquid, surrounds the liquid cloud and carries its atomized particles along into the whirling movement of the air.

Figure 2:
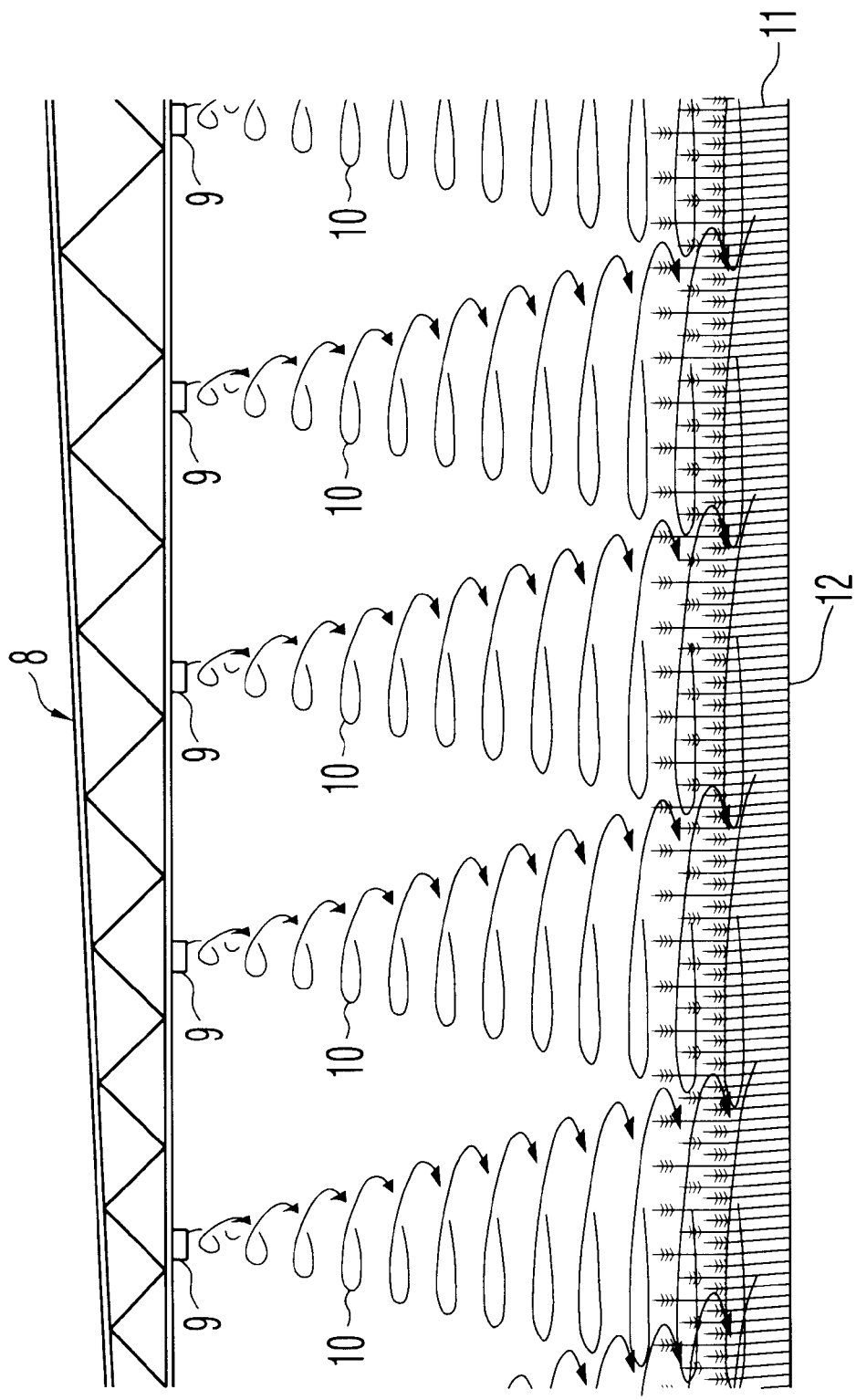
Figure 3:
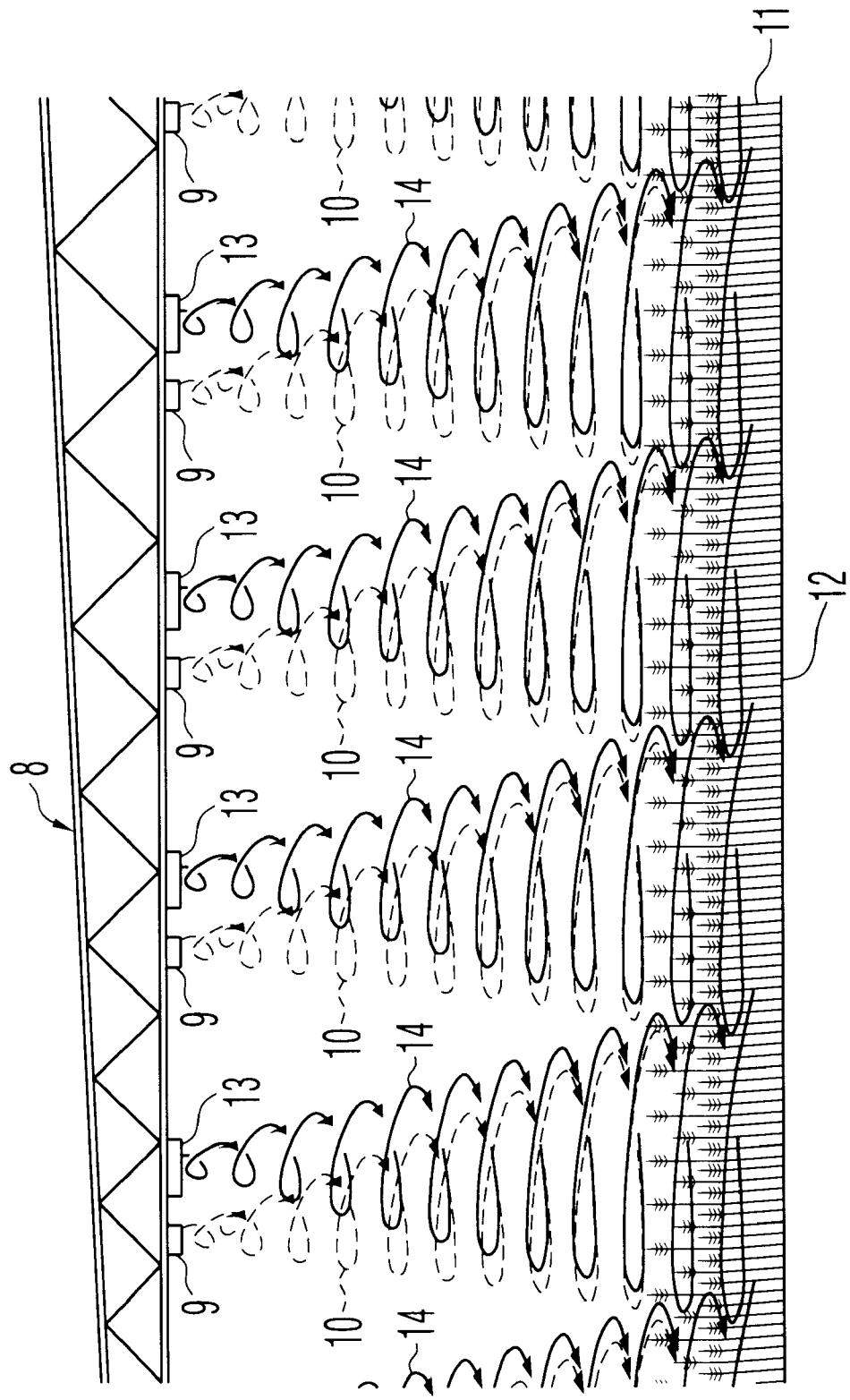
Figure 4:
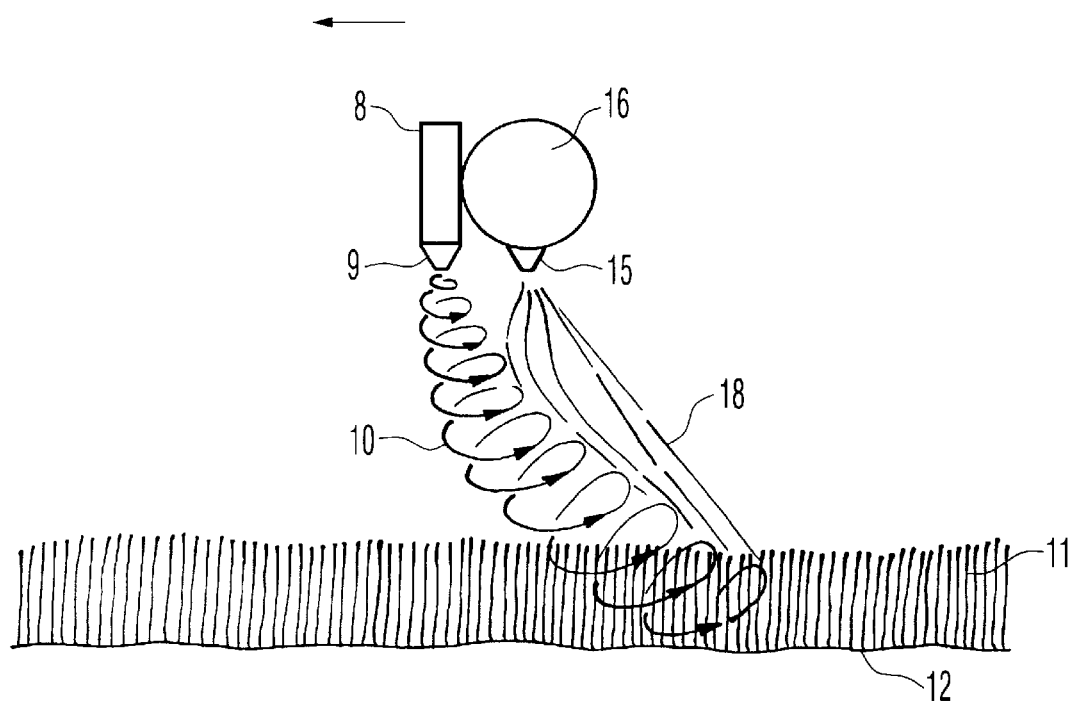
Figure 5:
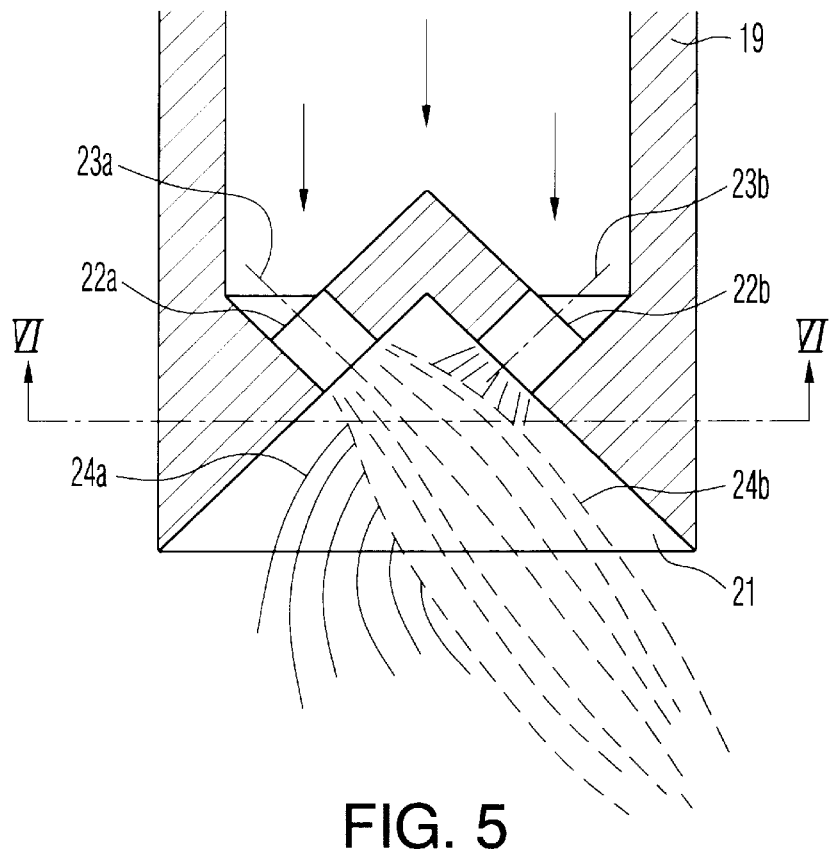
Figure 6:
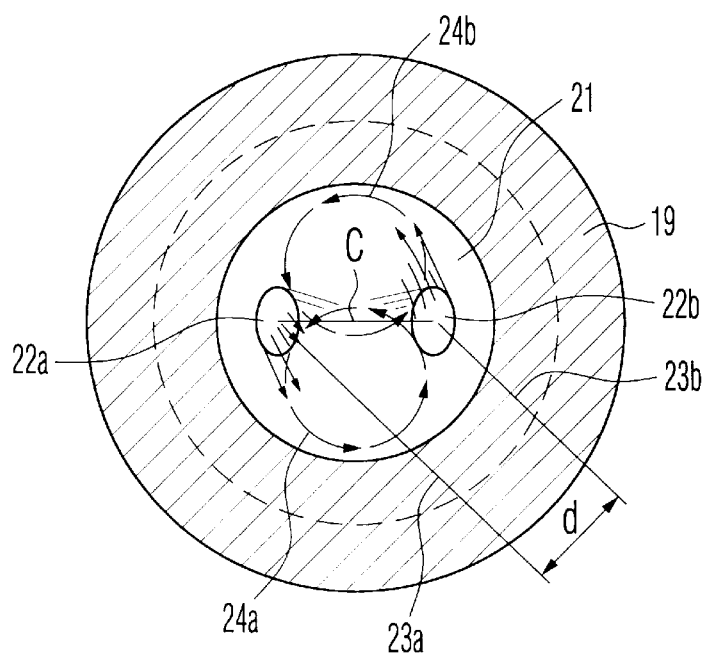
Figure 7:
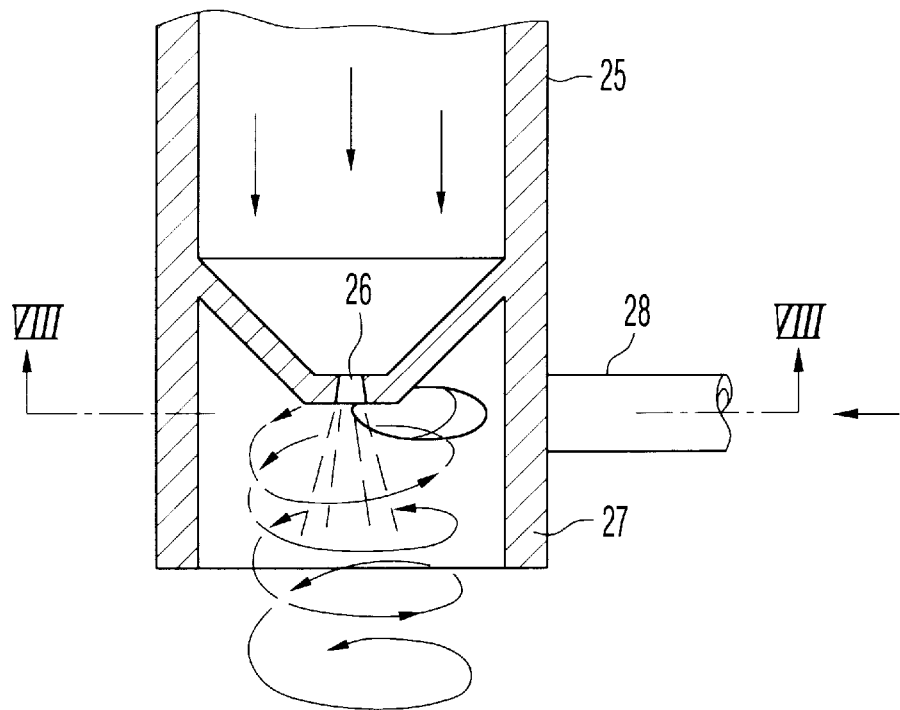
Figure 8:
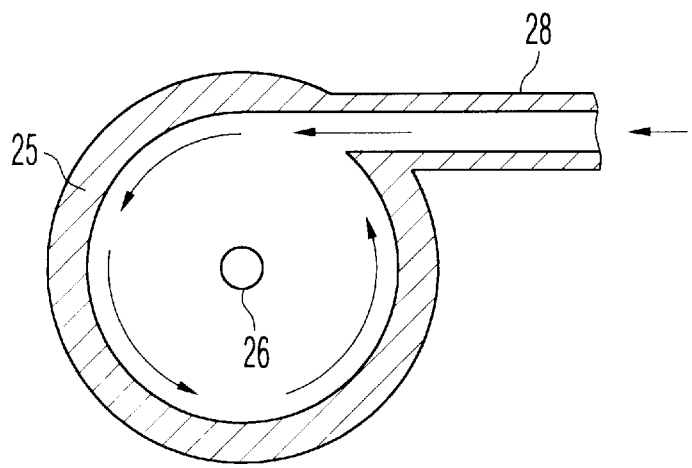

The invention will be explained in greater detail below, where only exemplary embodiments are described with reference to the drawing, in which FIG. 1, in perspective, schematically shows a field sprayer with a sprayer boom according to the invention, FIG. 2 shows a section of the boom shown in FIG. 1 with liquid nozzles sending out whirling clouds of crop spray towards a crop, FIG. 3 shows the same, but with air nozzles placed between the liquid nozzles for sending out whirling air currents towards the crop, FIG. 4 shows, seen from the side in a cross section, the arrangement shown in FIG. 3, but with laminar air currents, FIG. 5 shows, in a larger scale, a section of a cross section of a liquid or air nozzle with two nozzle orifices, FIG. 6 shows the same, taken on the line vl—vl in FIG. 5, FIG. 7 shows a section of a cross section of a liquid nozzle with an underlying shell supplied with compressed air via an admission tube tangentially fitted, FIG. 8 shows the same, taken on the line vlll—vlll in FIG. 7.

Figure 9:
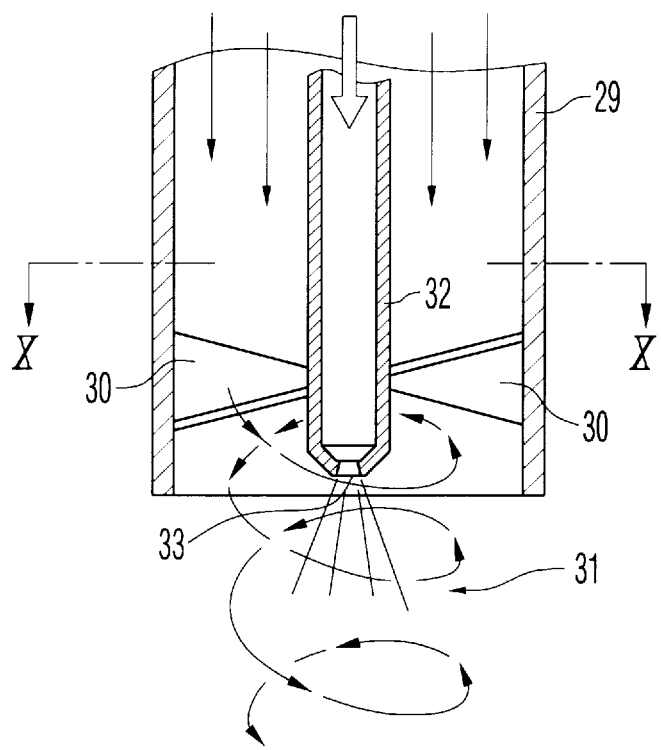
Figure 10:
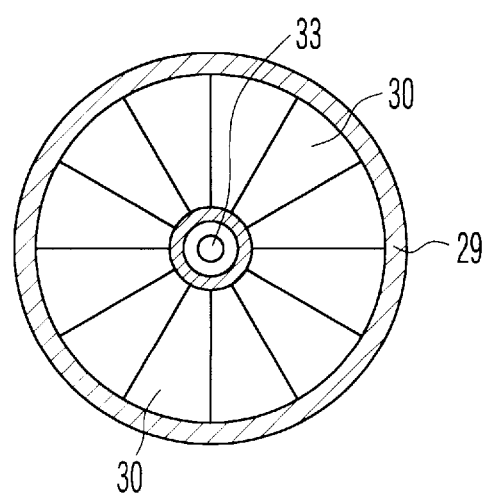

FIG. 9 shows a section of a cross section of an air nozzle with centrally mounted liquid nozzle and guide blades for putting the air current passing through the air nozzle into rotation, and FIG. 10 shows the same, taken on the line x—x in FIG. 9

In FIG. 1 is seen a conventional field sprayer generally designated by the reference number 1. The field sprayer is suspended on a tractor 2 by means of a rack 3 with a backwards facing bracket 4. The rack is furthermore carrying a storage tank 5 for a plant protective liquid. The field sprayer is extended, as shown, to both sides of the tractor. In the figure is seen one, mainly horizontal, air duct 6 and a blow device 7 for sending an air current through the air duct.

By means of such conventional field sprayers, a crop can be sprayed with a fine mist of spray fluid which is protected from drifting in windy weather by an air curtain which is sent out through air nozzles in the air duct 6. The finely atomized spray fluid in connection with the protecting air curtain ensures that it is possible to obtain an efficient spraying with a heavily reduced quantity of crop spray.

Both the liquid and the air current flow mainly laminarly down to and into the crop. These laminar jets are in themselves not especially stable against drifting, unless there, at the expense of the economy, are used rather large quantities of air and high velocities of flow.

In FIG. 2 is seen from the side, a segment of a sprayer boom 8 according to the invention with liquid nozzles 9 adjusted to sending out whirling clouds 10 of finely atomized crop spray liquid down to and into a crop 11 on the ground 12. Such whirls are in themselves very stable against drifting, and the spraying can therefore take place without the protecting air curtain which is necessary when conventional field sprayers are used.

The whirls efficiently open the crop and can therefore penetrate all over and precisely deposit the exact quantity of plant protective liquid necessary in each single case to protect the crop efficiently. The spraying can therefore be done with an unprecedented, extremely small quantity of crop spray. Thereby the environment is protected and the expenses for crop spray are reduced. Another advantage is that the tractor uses less fuel, since it no longer has to supply power to create a protecting air curtain.

In case the quantities applied of plant protective liquid are very small, it can, however, be an advantage to use a protecting air curtain, as shown in FIGS. 3 and 4.

In FIG. 3 there are, on the boom 8 between the liquid nozzles 9, placed air nozzles 13 which send whirling air currents 14 down towards the crop 11. It is assumed that the volume of the air current in this case is much greater than the volume of the liquid current, and that the air whirls consequently are much stronger than the liquid whirls. The strong and stable air whirls will therefore, as shown, catch up and absorb the whirling atomized liquid which therefore is efficiently protected from drifting. The air whirls and the liquid whirls are, so to speak, woven together into a whirl curtain which can easily have such a strength that it, even in heavy windy weather, will not be driven out of its course by the wind.

In FIGS. 2 and 3 the whirls are rotating in the same direction and only just touch each other at the crop 11. If the whirls are so wide that they, at a certain level, will overlap each other, it would be an advantage if adjacent whirls rotate in opposite directions so that the whirls will not slow each other down in the overlapping area. This advantageous variant is not shown in the drawing.

In FIG. 3 the air nozzles 13 are placed between the liquid nozzles 9. In FIG. 4, which shows a cross section of a sprayer boom according to the invention, the air nozzles 15, seen from the driving direction of the tractor, are placed behind the liquid nozzles 9. The air nozzles are placed on or are made in an air duct 16 which in itself is conventional. During the spraying work, a laminar air curtain 18 is sent out via the air nozzles 15 to protect the liquid whirls while the sprayer is driven in the direction indicated by the arrow.

This structure, which is somewhat less expensive to produce than the structure shown in FIG. 3 which operates with a curtain woven of whirling liquid and air flows, can be used in certain cases with a satisfactory result.

FIGS. 5 and 6 show a liquid nozzle 19 for creating a whirl by the sent out atomized crop spray which, under a rather high pressure, flows into the nozzle in the direction indicated by the arrows. The nozzle has an incurving bottom which limits a conical chamber 21. At the bottom, there are, close to one another and at almost opposite generators at the bottom, made two nozzle orifices 22a and 22b with axes 23a and 23b which, as seen in the side picture of FIG. 5, cross each other at a cross point C, but at a mutual distance d, as shown in FIG. 6.

The crop spray is, by the relatively high pressure, pressed out through the nozzles in almost conical, atomized liquid clouds 24a and 24b which, at the area around the axes of the cross point C, hit each other and thereby mutually are brought to rotate in the same direction, as indicated by the arrows in FIG. 6, then immidiately after they merge into one single rotating whirl of the type shown in FIGS. 2 and 3.

The whirl is already made in the conical chamber 21, and the whirling liquid which leaves the chamber 21 at high velocity will therefore, behind it, form a low pressure which pulls a proctecting and unifying air flow down around the atomized whirl in the direction of the arrows.

The best result can be obtained when the axes 23a and 23b of the nozzle orifices cross each other at an angle of between 0° and 180° and at a mutual distance of between a half and one times the diameter of the atomized liquid clouds in the crossing area, and the distance between the two nozzle orifices of a liquid nozzle is between 1 and 20 times, preferably between 1 and 10 times and especially between 1 and 5 times the diameter of a nozzle orifice.

It is to be noted that the effect obtained by means of the above described and in FIGS. 5 and 6 shown liquid nozzle with two nozzle orifices, can alternatively be obtained by two conventional nozzles (not shown), the nozzle orifices of which are placed in a similar way in relation to each other. There can also be used more than two nozzle orifices or several conventional nozzles for jointly making the sent out atomized liquid clouds form a whirl.

FIGS. 7 and 8 show a second embodiment of a liquid nozzle 25 for forming a whirl of atomized liquid. The liquid nozzle has an orifice 26 and can be designed in any appropriate way. In this case, the nozzle tapers off towards the nozzle orifice 26. The liquid flows at relatively high pressure in the direction indicated by the arrows and is, as fine particles, pressed out through the nozzle orifice almost in the shape of a fan.

The nozzle 25 is extended by a hanging shell 27 which, via a tangentially fitted admission tube 28, is supplied with air at a relatively high velocity from a compressed-air source (not shown). Since the air is supplied tangentially, it is made, best seen in FIG. 8, to rotate rapidly in the shell 27 in the direction indicated by the arrows, whereby the atomized liquid is carried along in the rotating movements of the air. This solution does not require great air volumes, and is so efficient that there, in most cases, will be no need of a particular air curtain to protect the whirl of air and liquid from the nozzle 25.

An actual air curtain of whirling air can be created by the same principle as in FIGS. 5 and 6, rating the nozzle for an air current.

FIGS. 9 and 10 show, however, a different embodiment of an air nozzle 29 for sending out a whirling air current. The air flows, in this case, through the nozzle in the direction indicated by the arrows and is made to rotate in a whirl 31 by passing a number of oblique guide blades 30 placed near the mouth of the nozzle. In the figure, only one set of guide blades are shown, but if required, several sets of guide blades can be placed axially after one another.

In the case shown, a liquid nozzle 32 is furthermore placed centrally in the air nozzle 29, the liquid nozzle 32 is supplied with crop spray from the direction indicated by the arrows. The liquid is pressed out through the orifice 33 of the nozzle in an almost fan-shaped, atomized cloud and is carried along in the whirling movement of the whirl 31. The atomized cloud whirl and the air whirl are therefore, right from the beginning, woven together and united with the adjacent whirls into a strong, coherent whirl curtain.

It has turned out that the air whirl is so strong that a similarly advantageous effect can be obtained even if the liquid nozzle is placed next to the air nozzle in the same way as shown in FIG. 4, but of the opposite movement pattern where the air whirls and the atomized liquid are merely sent out in the shape of a fan.

What is claimed is:

1. Method for spraying a field crop with a plant protective liquid in the shape of a number of clouds of atomized liquid which are sent out in the direction of the field crop through a number of liquid nozzles placed on a sprayer boom which, at the same time, is driven across the field crop, characterized in that each atomized liquid cloud is put into whirling movement, and that adjacent atomized liquid whirls are rotated in opposite direction of each other.

2. Method according to claim 1, characterized in that a number of air currents are sent out in the direction of the field crop via a number of air nozzles placed on the sprayer boom.

3. Method according to claim 2, characterized in that each air current is put into whirling movement, and that adjacent atomized liquid whirls and air whirls are created with opposite directions of rotation.

4. A sprayer boom for spraying a field crop with a plant protective liquid in the shape of a number of clouds of atomized liquid which, in the direction of the field crop, are sent out via a number of liquid nozzles placed on a sprayer boom which, at the same time, is driven across the field crop, characterized in that the sprayer boom comprises means to put each atomized liquid cloud into whirling movement in such a way that adjacent atomized liquid whirls are rotated in opposite direction of each other.

5. A sprayer boom according to claim 4, characterized in that there, on the sprayer boom, is placed a number of air nozzles for sending out a number of air currents which are directed towards the field crop.

6. A sprayer boom according to claim 5, characterized in that the air nozzles have means for creating air whirls in such a way that adjacent atomized air whirls are rotated in opposite direction of each other and in opposite direction of adjacent liquid whirls.

7. A sprayer boom according to claim 5, characterized in that the liquid nozzles and the air nozzles are arranged besides each other.

8. A sprayer boom according to claim 5, characterized in that the means to put each atomized liquid cloud into whirling movement consists of each liquid nozzle having at least two nozzle orifices with axes which, seen from the side, cross each other at an angle of between 0° and 180° and are separated by a distance of between a half and one times the diameter of one of the atomized liquid clouds in the crossing area.

9. A sprayer boom according to claim 5, characterized in that each liquid nozzle has the shape of a tube with an incurving bottom in which at least two nozzle orifices are made, and that the distance between any two nozzle orifices in a liquid nozzle is between 1 and 20 times the diameter of a nozzle orifice.

10. A sprayer boom according to claim 9, wherein the distance between any two nozzle orfices in a liquid nozzle is between 1 and 10 times the diameter of a nozzle orifice.

11. A sprayer boom according to claim 9, wherein the distance between any two nozzle orifices in a liquid nozzle is between 1 and 5 times the diameter of a nozzle orifice.

12. A sprayer boom according to claim 5, characterized in that within each air nozzle is placed a liquid nozzle.

13. A sprayer boom according to claim 5, characterized in that there, in continuation of each liquid nozzle, is a skirt which is connected to a compressed air source, and that the skirt comprises means for bringing the air into rapid rotation.

* * * * *